United States Patent [19]

Murase et al.

[11] Patent Number: 4,528,122

[45] Date of Patent: Jul. 9, 1985

[54] N-TYPE POLYACETYLENE AND A PROCESS FOR PRODUCING THE SAME

[75] Inventors: Makoto Murase; Arimitsu Usuki, both of Nagoya, Japan

[73] Assignee: Kabushiki Kaisha Toyota Chuo Kenkyusho, Japan

[21] Appl. No.: 659,842

[22] Filed: Oct. 11, 1984

[30] Foreign Application Priority Data

Oct. 11, 1983 [JP] Japan .................................. 58-189638
Jan. 17, 1984 [JP] Japan .................................... 59-6900
Mar. 5, 1984 [JP] Japan .................................. 59-42273

[51] Int. Cl.$^3$ ............................................... C08K 5/16
[52] U.S. Cl. ..................................... 252/518; 252/521; 524/236; 524/251; 525/328.1
[58] Field of Search ............... 526/285; 524/204, 236, 524/251; 252/518, 521; 525/328.1

[56] References Cited

U.S. PATENT DOCUMENTS 4,404,126 9/1983 Muench .............................. 526/285

Primary Examiner—Paul R. Michl
Attorney, Agent, or Firm—Oblon, Fisher, Spivak, McClelland & Maier

[57] ABSTRACT

An n-type polyacetylene, comprising polyacetylene doped with a mixture of a metal amide and a primary and/or secondary amine compound of the formula:

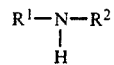

wherein $R^1$ and $R^2$ are each independently hydrogen, alkyl, aryl and allyl, or a substitutent group which contains a carbonyl, silyl or amino group, with the proviso that if one of the $R^1$ and $R^2$ is a hydrogen atom, the other group is not a hydrogen atom.

17 Claims, 3 Drawing Figures

N-TYPE POLYACETYLENE AND A PROCESS FOR PRODUCING THE SAME

BACKGROUND OF THE INVENTION

1. Field of the Invention

This invention relates to a uniformly doped n-type polyacetylene which has oxidation stability and to a process for producing the same.

2. Description of the Prior Art

Electrically conductive polymers have recently been discovered which make it possible to produce inexpensive products having large surface areas. The flexibility of the polymers render the same useful for making solar cells, diodes, transistors and other elements of semiconductor devices. Polyacetylene, among other electrically conductive polymers, has drawn particularly attention because it can be produced inexpensively and because it provides an excellent element for a semiconductor device.

When an electrically conductive polymer is used in the manufacture of a semiconductor device, it is necessary to control its semiconductor characteristics so that it may be possible to obtain a p- or n-type semiconductor having a large area, heat and oxidation stability and low specific resistance. A p-type polymer semiconductor is easy to produce, for example, by doping polyacetylene with $AsF_5$, $I_2$ or $HCl$. Virtually no n-type polymer semiconductor, on the other hand, has been produced successfully. There has therefore been a need for stable n-type polymer semiconductors.

Various methods have been proposed for synthesizing n-type polyacetylene, but none of these methods have been found capable of synthesizing a stable product. One conventional method of doping polyacetylene is electrochemical doping in which polyacetylene is used as a cathode in a dopant solution, while a platinum or other metal plate is used as the anode in the electrochemical cell. Dopants which have been used in the past include ions of compounds of the following formulas:

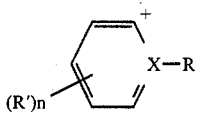

wherein X is O or N, and R and R' are each an alkyl group (Japanese Laid-Open Patent Publication No. 38743/1983);

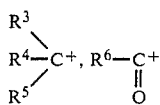

wherein $R^3$ to $R^6$ are each an alkyl group (Japanese Laid-Open Patent Publication No. 38745/1983);

(Japanese Laid-Open Patent Publication No. 89640/1983); and

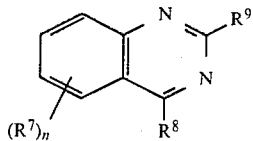

wherein $R^7$ to $R^9$ are each an alkyl group (Japanese Laid-Open Patent Publication No. 93748/1983).

The electrochemical method has the disadvantage of requiring a large apparatus including a source of constant electric current supply and a platinum or other metal plate which is used as the electrode of opposite polarity to the polyacetylene electrode. The use of polyacetylene itself as the cathode has the disadvantage that in the doping process the density of doping ions on the surface of the cathode differs from the density of the interior of polyacetylene, which results in non-uniformity of doping. The n-type polyacetylene prepared by this method is difficult to use in semiconductor devices.

A method has also been proposed which does not rely on electrochemistry, but instead simply involves the dipping of polyacetylene in a dopant solution. In one example, polyacetylene is dipped into a tetrahydrofuran solution of sodium naphthalide. The preparation of a stable dopant is, however, difficult, and the n-type polyacetylene prepared by this prior art method is so unstable that it is readily decomposes upon exposure to the air. It is not suitable for any partical use. A need therefore, continues to exist for a satisfactory method by which n-doped polyacetylene can be obtained.

SUMMARY OF THE INVENTION

Accordingly, one object of the present invention is to provide a stable n-type polyacetylene which is suitable for use in the manufacture of semiconductor devices or the like and to provide a process which comparatively easily provides for the production of an n-type polyacetylene.

It is another object of the present invention to provide an n-type polyacetylene which has a specific resistance, high stability and excellent oxidation resistance.

It is still another object of the present invention to provide a process which enables the production of a uniformly doped n-type polyacetylene.

It is a further object of the present invention to provide a process which enables the production of an n-type polyacetylene product having a large surface area.

Briefly, these objects and other objects of the present invention as hereinafter will become more readily apparent can be attained by an n-type polyacetylene which comprises polyacetylene doped with a mixture of a metal amide and a primary and/or secondary amine compound of the formula:

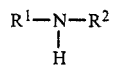

wherein $R^1$ and $R^2$ are each independently hydrogen, alkyl, aryl or allyl, or a substituent group containing a carbonyl, silyl or amino group, with the proviso that if one of the R groups is a hydrogen atom, the other R group is not a hydrogen atom.

The process by which the present n-type polyacetylene is produced comprises placing in a hydrocarbon solvent polyacetylene and a mixture of a metal amide and a primary and/or secondary amine compound of the formula above to prepare a solution thereof, heating the solution, and then removing the polyacetylene therefrom.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
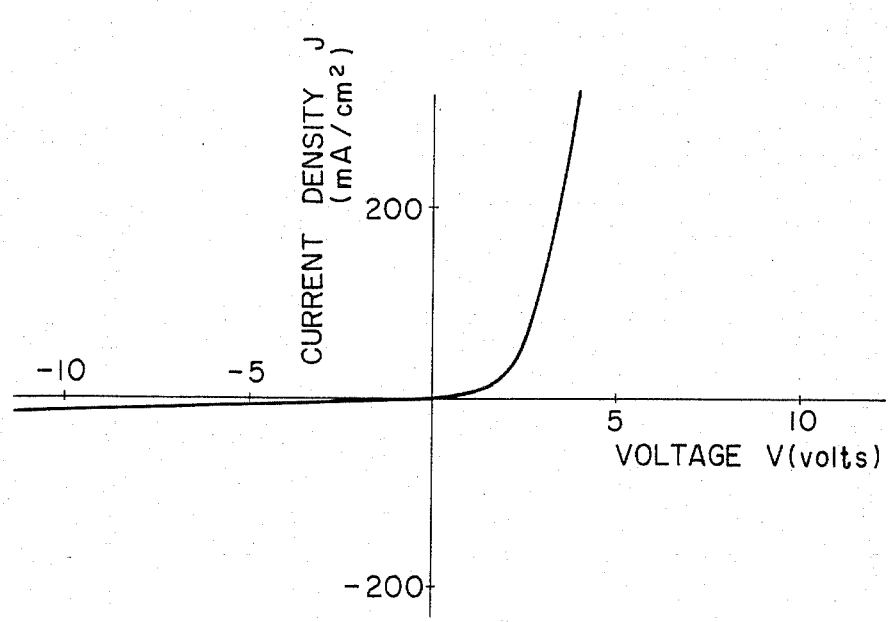
FIG. 1 is a graph showing the relationship between current density and voltage in a junction of the n-type polyacetylene prepared according to the procedure of EXAMPLE 1 and p-type silicon.

Either cis- or trans-polyacetylene may be used in the present invention. The use of cis-polyacetylene is, however, preferred, since it is more easily doped during its transformation of the trans-form of the polymer in a dopant solution when it is heated. The polyacetylene may be in any physical form such as a membrane, fibers or powders, but the use of a membrane of polyacetylene is preferred.

The dopant mixture which is used to prepare the n-type polyacetylene of the present invention contains a primary and/or secondary amine compound of the formula shown above. The amines have an active proton which is easily released to form a stable nitrogen anion. The amine reacts with a metal amide of the formula: $MNH_2$, wherein M is a metal atom such as lithium, sodium or potassium as shown below. The proton of the amine is replaced by the metal ion of the amide salt to form a stable n-type dopant as follows:

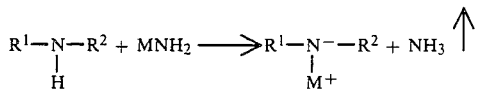

Suitable examples of the primary and secondary amine compounds which form the dopant include n-butylamine, n-amylamine, n-hexylamine, n-heptylamine, n-octylamine, n-nonylamine, n-decylamine, 1,4-diaminobutane, 1,3-diaminopropane, dicyclohexylamine, aminomethyltrimethylsilane, 2-aminoethylaminomethyltrimethylsilane, cyclohexylaminomethyltrimethylsilane, N-trimethylsilylacetoamide, isopropylaminomethyltrimethylsilane, methyltris(cyclohexylamino)silane, hexamethyldisilazane, hexaethyldisilazane and the like. One or more of these compounds may be used in the present invention.

The metal amide reacts with the primary and/or secondary amine compound, dissolves in a solvent and promotes uniform doping. It is preferable to use, for example, lithium, sodium or potassium amide, or mixtures thereof. Preferably, not more than 10 moles of the metal amide is used per mole of the primary and/or secondary amine compound. If any greater amount of the metal amide is employed, some metal amide is likely to remain undissolved on the polyacetylene. Most preferably, 0.5 to 2 moles of the metal amide is used in order to facilitate the reaction shown above which forms the dopant.

With regard to the polyacetylene, preferably not more than 50 g of polyacetylene is used per mole of the primary and/or secondary amine compound. If any larger quantity of polyacetylene is used, it is likely that some polyacetylene may remain undoped.

The hydrocarbon solvent which is used promotes the reaction between the amide salt and amine reactants so that the polyacetylene is doped uniformly. Suitable hydrocarbon solvents include, for example, benzene, toluene, xylene, hexane, cyclohexane, dioxane, tetrahydrofuran, and mixtures thereof.

The metal amide and amine mixture and polyacetylene are placed in the hydrocarbon solvent and heated so that the solution may be homogenized and so that the metal amide and amine may react to facilitate doping of the polyacetylene. The solution may be refluxed to promote homogenization. This heating may last for 0.5 to 10 hours at a temperature of 80° C. to 150° C., depending on the hydrocarbon solvent used and the primary and/or secondary amine compound which is employed. If the heating time is less than 0.5 hours, the reaction of the metal amide and amine is likely to take place less effectively. If the mixture exceeds 150° C., the metal amide and amine are likely to thermally decompose with the result that no doping action will be exhibited. Then, the polyacetylene is removed from the solution and washed for the removal of the dopant from its surface to yield n-type polyacetylene according to the present invention.

The n-type polyacetylene of the present invention is uniformly doped with the dopant and has low specific resistance. It is stable trans-polyacetylene by virtue of the dopant, and its specific resistance remains relatively stable and it posesses excellent oxidation resistance even upon exposure to the air. The n-type polyacetylene of the present invention can easily be joined under pressure with a p-type semiconductor such as silicon to form a p/n junction which is suitable for use as an element for an electronic device. The junction with p-type polyacetylene shows particularly good current density-voltage characteristics, which enables the production of solar cells of entirely plastic construction.

The excellent n-type polyacetylene of the present invention can be produced by a process in which a mixture of a primary and/or secondary amine compound of the formula supra and a metal amide and polyacetylene are heated in a hydrocarbon solvent, whereby cis-polyacetylene is easily transformed into stable trans-polyacetylene, and the amide salt and amine undergoes the reaction shown supra. The metal complex formed by this reaction is dissolved in the solvent to form a uniform solution which provides an n-type dopant. Ammonia is also generated simultaneously in the reaction. According to the process of the present invention, the mere dipping of polyacetylene in such a solution enables the production of stable n-type polyacetylene. Moreover, the use of a uniform dopant solution enables the production of uniformly doped n-type polyacetylene having a large surface area.

Having generally described this invention, a further understanding can be obtained by reference to certain specific examples which are provided herein for purposes of illustration only and are not intended to be limiting unless otherwise specified.

EXAMPLE 1

Dried toluene was used as a hydrocarbon solvent and a 10 mm square piece of cis-polyacetylene having a specific resistance of $10^{10}$ ohms cm was dipped in 15 ml of the solvent. A mixture of 3.55 g (0.022 mole) of hexamethyldisilazane (the compound of the formula above wherein $R^1$ and $R^2$ are each $(CH_3)_3Si$) and 0.78 g (0.020 mole) of sodium amide was added to the solvent, and the resulting solution was heated for five hours under reflux with an argon stream. Then, polyacetylene was removed from the solution to yield the n-type polyacetylene product of the present invention. It showed a weight increase of 70% and a specific resistance as low as 12.9 ohms cm.

The n-type polyacetylene product was joined with a p-type silicon semiconductor and a p-type polyacetylene, and the current density-voltage (J-V) characteristics of each junction were examined. The n-type polyacetylene of the present invention was joined at a pressure of 2 kg/cm² to p-type silicon doped with boron and having a specific resistance of 10 ohms cm. The J-V characteristics of the junction are shown in FIG. 1. FIG. 1 shows good rectification characteristics and confirms that the polyacetylene of the present invention is of the n-type.

Figure 2:
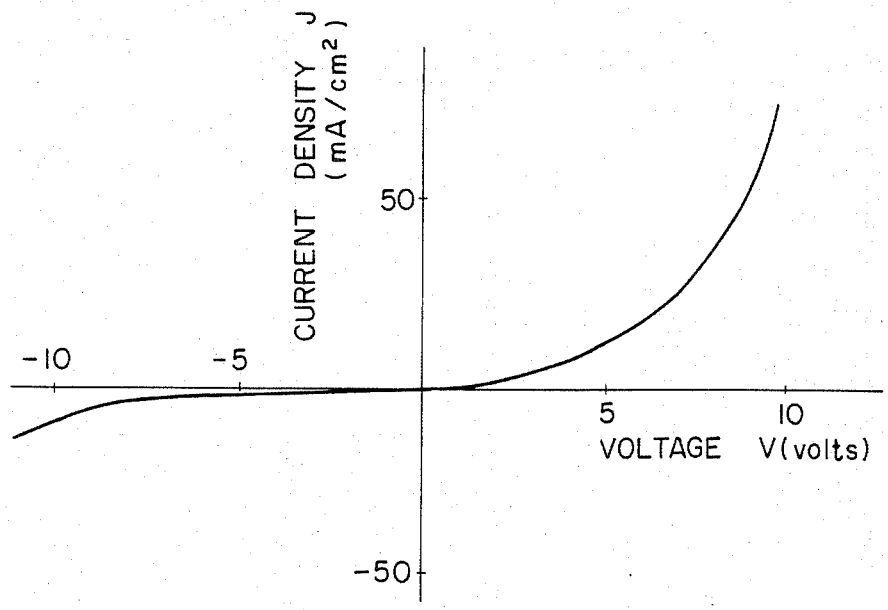
FIG. 2 is a graph similar to FIG. 1, but showing a junction of the n-type polyacetylene of EXAMPLE 1 with p-type polyacetylene.

The n-type polyacetylene of the present invention was also joined to p-type polyacetylene doped with iodine and having a specific resistance of 10 ohms cm. The J-V characteristics of the junction are shown in FIG. 2. FIG. 2 shows good rectification characteristics and confirms that the use of n-type polyacetylene of the present invention enables the production of a solar cell of entirely plastic construction.

The n-type polyacetylene of the present invention was left in the air and examined for changes in specific resistance. It shows a specific resistance of $10^3$ ohms cm after two hours and $10^7$ ohms cm after four hours. These results indicate that the n-type polyacetylene of the present invention is very stable in comparison to the conventional products which easily decompose.

EXAMPLE 2

Figure 3:
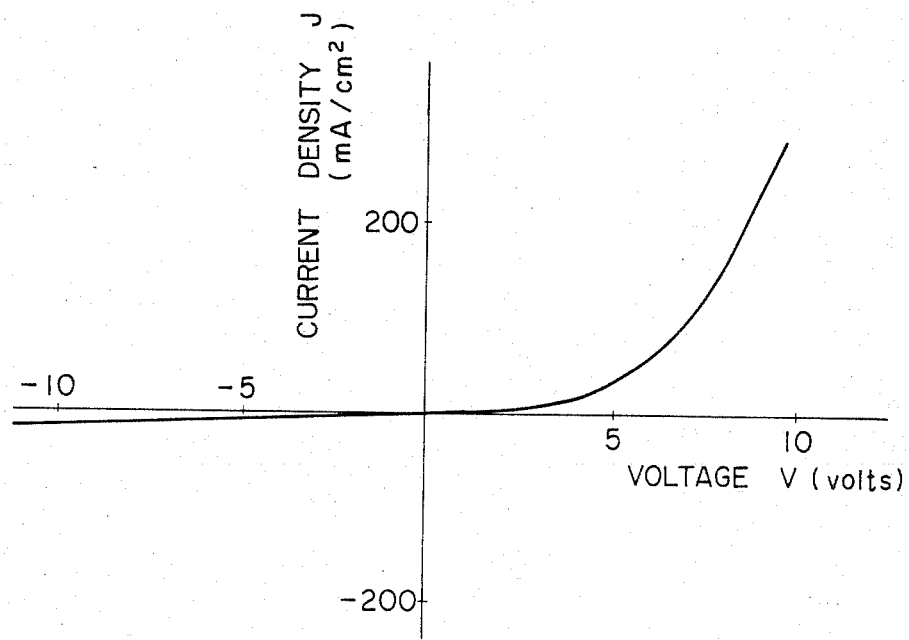
FIG. 3 is a graph similar to FIG. 1, but showing a junction of the n-type polyacetylene prepared by the procedure of EXAMPLE 2 with p-type silicon.

The procedures of EXAMPLE 1 were repeated, except that trans-polyacetylene having a specific resistance of $10^8$ ohms cm was used. The resulting n-type polyacetylene had a specific resistance of $10^3$ ohms cm and was joined to p-type silicon having a specific resistance of 10 ohms cm. The J-V characteristics of the junction are shown in FIG. 3. FIG. 3 shows good rectification characteristics and confirms that the polyacetylene of the present invention is of the n-type.

EXAMPLE 3

Six samples of n-type polyacetylene (Samples Nos. 1 to 6) were prepared by repeating the procedure of EXAMPLE 1, except that the primary and secondary amine compounds and the reaction time shown in TABLE 1 were used. Each of the samples showed a low specific resistance as is evident from the data in TABLE 1. Each sample was joined to p-type silicon as in EXAMPLE 1, and the J-V characteristics of the junction were examined. All the junctions showed good rectification characteristics comparable to the results of EXAMPLE 1. Each sample was also joined to p-type polyacetylene as in EXAMPLE 1, and the J-V characteristics of each junction were examined. All the junctions showed good rectification characteristics comparable to the results of EXAMPLE 1. These results confirm that the polyacetylene of the present invention is of the n-type.

TABLE 1

| Sample No. | Primary or secondary amine compound | Amine Formula $R^1$ | $R^2$ | Reaction time (hours) | Specific resistance (ohms cm) |
|---|---|---|---|---|---|
| 1 | Aminomethyltrimethylsilane | $(CH_3)_3SiCH_2$ | H | 2 | 5.4 |
| 2 | 2-Aminoethylaminomethyltrimethylsilane | $(CH_3)_3SiCH_2$ | $CH_2CH_2NH_2$ | 1 | 1.5 |
| 3 | Cyclohexylaminomethyltrimethylsilane | $(CH_3)_3SiCH_2$ | cyclohexyl | 3 | 7.14 |
| 4 | N—Trimethylsilylacetoamide | $(CH_3)_3Si$ | $COCH_3$ | 4 | 909 |
| 5 | Isopropylaminomethyltrimethylsilane | $(CH_3)_3SiCH_2$ | $CH(CH_3)_2$ | 1 | 50 |
| 6 | Methyltris(cyclohexylamino)silane | $CH_3Si(NH\text{-cyclohexyl})_2$ | cyclohexyl | 2 | 57 |

EXAMPLE 4

Ten samples of n-type polyacetylene (Samples Nos. 7 to 16) were prepared by repeating the procedure of EXAMPLE 1, except that mixtures of 0.01 mole of each of the primary and secondary amine compounds shown in TABLE 2 and 0.01 mole of sodium amide were used, and that a reflux heating time of two hours was used. Each example was joined to p-type silicon as in EXAMPLE 1 and the J-V characteristics of each junction were examined. All the junctions showed good rectification characteristics comparable to the results of EXAMPLE 1. Each sample was also joined to p-type polyacetylene as in EXAMPLE 1 and the J-V characteristics of each junction were examined. All the junctions showed good rectification characteristics comparable to the results of EXAMPLE 1. These results confirm that the polyacetylene of the present invention is of the n-type.

TABLE 2

| Sample No. | Primary or secondary amine compound | Amine Formula $R^1$ | $R^2$ | Specific resistance (ohms cm) |
|---|---|---|---|---|
| 7 | n-Butylamine | $CH_3(CH_2)_3$ | H | 2.4 |
| 8 | n-Amylamine | $CH_3(CH_2)_4$ | H | 90 |
| 9 | n-Hexylamine | $CH_3(CH_2)_5$ | H | 88 |
| 10 | n-Heptylamine | $CH_3(CH_2)_6$ | H | 3.6 |
| 11 | n-Octylamine | $CH_3(CH_2)_7$ | H | 12.5 |
| 12 | n-Nonylamine | $CH_3(CH_2)_8$ | H | 12.2 |
| 13 | n-Decylamine | $CH_3(CH_2)_9$ | H | 75 |
| 14 | 1,4-Diaminobutane | $NH_2(CH_2)_4$ | H | 42 |
| 15 | 1,3-Diaminopropane | $NH_2(CH_2)_3$ | H | 27 |
| 16 | Dicyclohexylamine | 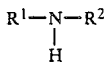 | 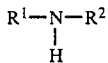 | 68 |

COMPARATIVE EXAMPLE

A flask was charged with 15 ml of dried tetrahydrofuran (THF), and 1.28 g of naphthalene and 0.28 g of metallic sodium were dissolved therein. The solution was stirred for two to three hours at a temperature of $-10°$ C. to prepare sodium naphthalide. Trans-polyacetylene having a specific resistance of $10^8$ ohms cm was dipped into the solution containing sodium naphthalide. After three hours, the polyacetylene was removed from the solution to provide a comparative n-type polyacetylene. It was not uniformly doped, and showed a lack of uniformity in specific resistance in the range of $8 \times 10^{-1}$ to 10 ohms cm. It was very unstable and caught fire upon exposure to the air. These results indicate that the product of the comparative example is unsatisfactory as an n-type polyacetylene and is difficult to employ in the manufacture of solar cell devices and other electronic devices.

Having now fully described this invention, it will be apparent to one of ordinary skill in the art that many changes and modifications can be made thereto without departing from the spirit or scope of the invention as set forth herein.

What is claimed as new and is intended to be secured by Letters Patent of the United States is:

1. An n-type polyacetylene, comprising:
polyacetylene doped with a mixture of a metal amide and a primary and/or secondary amine compound of the formula:

$$R^1-N-R^2$$
$$|$$
$$H$$

wherein $R^1$ and $R^2$ are each independently hydrogen, alkyl, aryl and allyl, or a substituent group which contains a carbonyl, silyl or amino group, with the proviso that if one of the $R^1$ and $R^2$ is a hydrogen atom, the other group is not a hydrogen atom.

2. The n-type polyacetylene of claim 1, wherein said amine compound is selected from the group consisting of n-butylamine, n-amylamine, n-hexylamine, n-heptylamine, n-octylamine, n-nonylamine, n-decylamine, 1,4-diaminobutane, 1,3-diaminopropane, dicyclohexylamine, aminomethyltrimethylsilane, 2-aminoethylaminomethyltrimethylsilane, cyclohexylaminomethyltrimethylsilane, N-trimethylsilylacetoamide, isopropylaminomethyltrimethylsilane, methyltris(cyclohexylamino)silane, hexamethyldisilazane, hexaethyldisilazane, and mixtures thereof.

3. The n-type polyacetylene of claim 1, wherein said metal amide is selected from the group consisting of lithium amide, sodium amide, potassium amide, and mixtures thereof.

4. The n-type polyacetylene of claim 1, wherein said mixture contains up to a maximum of 10 moles of said metal amide per mole of said amine compound.

5. The n-type polyacetylene of claim 1, wherein said polyacetylene is employed in a quantity up to a maximum of 50 g per mole of said amine compound.

6. The n-type polyacetylene of claim 1, wherein said amine compound is hexamethyldisilazane and said metal amide is sodium amide.

7. The n-type polyacetylene of claim 1, wherein said amine compound is aminomethyltrimethylsilane and said metal amide is sodium amide.

8. The n-type polyacetylene of claim 1, wherein said amine compound is 2-aminoethylaminomethyltrimethylsilane and said metal amide is sodium amide.

9. A process for producing n-type polyacetylene, comprising:
placing in a hydrocarbon solvent polyacetylene and a mixture containing a metal amide and a primary and/or secondary amine compound of the formula:

$$R^1-N-R^2$$
$$|$$
$$H$$

wherein $R^1$ and $R^2$ are each independently hydrogen, alkyl, aryl or allyl, or a substituent group containing a carbonyl, silyl or amino group, with the proviso that if one of $R^1$ and $R^2$ is a hydrogen atom, the remaining R substituent is not a hydrogen atom, thereby preparing a solution thereof;
heating said solution so as to allow said polyacetylene to be doped with said mixture; and
removing said doped polyacetylene from said solution.

10. The process of claim 9, wherein said solvent is selected from the group consisting of benzene, toluene, xylene, hexane, cyclohexane, dioxane, tetrahydrofuran, and mixtures thereof.

11. The process of claim 9, wherein said amine compound is selected from the group consisting of n-butylamine, n-amylamine, n-hexylamine, n-heptylamine, n-octylamine, n-nonylamine, n-decylamine, 1,4-diaminobutane, 1,3-diaminopropane, dicyclohexylamine, aminomethyltrimethylsilane, 2-aminoethylaminomethyltrimethylsilane, cyclohexylaminomethyltrimethylsilane, N-trimethylsilylacetoamide, isopropylaminomethyltrimethylsilane, methyltri(cyclohexylamino)silane, hexamethyldisilazane, hexaethyldisilazane, and mixtures thereof.

12. The process of claim 9, wherein said metal amide is selected from the group consisting of lithium amide, sodium amide, potassium amide, and mixtures thereof.

13. The process of claim 9, wherein said mixture contains up to a maximum of 10 moles of said metal amide per mole of said amine compound.

14. The process of claim 9, wherein said polyacetylene is employed in a quantity up to a maximum of 50 g per mole of said amine compound.

15. The process of claim 9, wherein said solution is heated at a temperature in the range of from 80° to 150° C.

16. The process of claim 15, wherein said solution is heated at reflux temperature.

17. The process of claim 9, wherein said solution is heated for 0.5 to 10 hours.

* * * * *